(12) United States Patent
Jang

(10) Patent No.: US 7,236,639 B2
(45) Date of Patent: Jun. 26, 2007

(54) METHOD AND APPARATUS FOR CODING DIGITAL VIDEO SIGNAL BASED ON GROUPED ZEROTREE WAVELET IMAGE CODING ALGORITHM

(75) Inventor: Woo-young Jang, Seoul (KR)

(73) Assignee: Samsung Electronics Co., Suwon (KR)

( * ) Notice: Subject to any disclaimer, the term of this patent is extended or adjusted under 35 U.S.C. 154(b) by 648 days.

(21) Appl. No.: 10/353,895

(22) Filed: Jan. 29, 2003

(65) Prior Publication Data

US 2003/0231798 A1    Dec. 18, 2003

(30) Foreign Application Priority Data

Jun. 12, 2002    (KR) .............................. 2002-32971

(51) Int. Cl.
*G06K 9/36*    (2006.01)
*G06K 9/46*    (2006.01)

(52) U.S. Cl. ..................... 382/240; 382/248

(58) Field of Classification Search ................ 382/240, 382/248
See application file for complete search history.

(56) References Cited

U.S. PATENT DOCUMENTS 6,157,746 A * 12/2000 Sodagar et al. ............. 382/240
6,445,823 B1 * 9/2002 Liang ......................... 382/232

* cited by examiner

*Primary Examiner*—Phuoc Tran
(74) *Attorney, Agent, or Firm*—F. Chau & Associates, LLC

(57) ABSTRACT

Provided are a method of and an system for coding a grouped zerotree wavelet image having high coding efficiency regardless of the scale of a wavelet transform. According to an embodiment of the present invention, a method of coding an input image to a bitstream by using a zerotree wavelet transform, the method comprises merging a plurality of adjacent zerotrees, and coding the merged zerotrees to one symbol and outputting the symbol. The method further comprises transforming the input image to a wavelet domain having a plurality of wavelet coefficients via the zerotree wavelet transform, and generating the plurality of adjacent zerotrees each having the plurality of wavelet coefficients.

11 Claims, 8 Drawing Sheets

FIG. 5C

SPIHT(barbara)

GSPIHT(barbara)

_US 7,236,639 B2_

METHOD AND APPARATUS FOR CODING DIGITAL VIDEO SIGNAL BASED ON GROUPED ZEROTREE WAVELET IMAGE CODING ALGORITHM

BACKGROUND OF THE INVENTION

1. Field of the Invention

The present invention relates to a method of and an apparatus for compressing a digital video signal, and more particularly, to a method of and an apparatus for coding a zerotree wavelet image based on a zero tree wavelet transform.

2. Description of Related Art

Image transmission and storage are important for Internet and multimedia services. However, since image transmission and storage systems have limited bandwidths and memories, image coding is important to the efficiency, speed, and costs of image transmission and storage systems.

Image coding standard H.263 shows reliable coding efficiency. The moving picture experts group (MPEG)-4 and joint photographic experts group (JPEG)-2000 have also introduced various coding techniques for improved coding efficiency.

In particular, in the MPEG-4 and the JPEG-2000, to achieve coding efficiency, wavelet transforms have been considered as a replacement for existing discrete cosine transforms (DCT).

In MPEG-4, coding employing the wavelet transform (hereinafter, referred to as wavelet coding) has been used in texture coding to achieve scalability. Also, in the JPEG-2000, the wavelet coding is used to maximize the coding efficiency by preventing images of various sizes, particularly, very large images, from being blocked. Blocking refers to artificial frontiers in images coding by discrete cosine transforms, such as MPEG-4 and H.263.

Embedded Zerotree Wavelet (EZW) coding (J. M. Shapiro) and Set Partitioning in Hierarchical Trees (SPIHT) coding (A. Said and W. A. Pearlman) are efficient image coding techniques that attempt to eliminate blocking.

These coding techniques can organize a plurality of wavelet coefficients into one symbol, i.e., a zerotree, using a spatial location and orientation of a wavelet coefficient shown in FIG. 1 to improve compression efficiency.

However, in general, MPEG-4 and JPEG-2000 systems, which are based on a discrete wavelet transform, are limited and the number of wavelet decompositions is fixed. Thus, when the size of an image varies, or the number of wavelet decompositions varies depending on the characteristics of the image, the coding efficiencies of the MPEG-4 and JPEG-2000 systems are compromised.

Therefore, a need exists for a method and apparatus for coding a grouped zerotree wavelet image having high coding efficiency irrespective of the scale of a wavelet transform.

SUMMARY OF THE INVENTION

Preferred embodiments of the present invention will be described below in more detail, with reference to the accompanying drawings:

According to an embodiment of the present invention, a method of coding an input image to a bitstream by using a zerotree wavelet transform, the method comprises merging a plurality of adjacent zerotrees, and coding the merged zerotrees to one symbol and outputting the symbol.

The method further comprises transforming the input image to a wavelet domain having a plurality of wavelet coefficients via the zerotree wavelet transform, and generating the plurality of adjacent zerotrees each having the plurality of wavelet coefficients.

According to an embodiment of the present invention, a method of coding an input image to a bitstream by using a wavelet transform for generating a plurality of wavelet trees each having a plurality of wavelet coefficients comprises (a) determining whether each of the wavelet trees is a zero tree, (b) determining adjacent zerotrees, (c) merging the adjacent zerotrees, and (d) coding merged zerotrees to one symbol and outputting the symbol.

If it is determined in step (a) that each of the wavelet trees is not a zero tree, wavelet coefficients belonging to the each of the wavelet trees are separately coded and output.

If it is determined in step (a) that one zero tree exists, the zerotree is coded and output.

According to an embodiment of the present invention, a computer-readable recording medium is provided in which a program for executing a method of coding an input image to a bitstream by using a zerotree wavelet transform is recorded. The method comprises merging a plurality of adjacent zerotrees, and coding the merged zerotrees to one symbol and outputting the symbol.

According to another embodiment of the present invention, a computer-readable recording medium is provided in which a program for executing a method of coding an input image to a bitstream by using a wavelet transform for generating a plurality of wavelet trees each having a plurality of wavelet coefficients is recorded. The method comprises (a) determining whether each of the wavelet trees is a zerotree, (b) determining adjacent zerotrees, (c) merging the adjacent zerotress, and (d) coding merged zerotrees to one symbol and outputting the symbol.

If it is determined in step (a) that each of the wavelet trees is not a zerotree, wavelet coefficients belonging to each of the wavelet tree are separately coded and output.

If it is determined in step (a) that one zerotree exists, the zerotree is coded and output.

According to an embodiment of the present invention, an encoder of coding a zerotree wavelet-image, the encoder comprises a discrete wavelet transform circuit which wavelet-transforms an input image to a wavelet domain having a plurality of wavelet coefficients, a zerotree generator which generates a plurality of zerotrees corresponding to spatial locations and orientations of the plurality of wavelet coefficients, and a zerotree coder which merges a plurality of adjacent zerotrees, codes merged zerotrees to one symbol, and outputting the symbol.

According to another embodiment of the present invention, an encoder of coding a zerotree wavelet image, the encoder comprises a discrete wavelet transform circuit which wavelet-transforms an input image to a wavelet domain having a plurality of wavelet coefficients, and a zerotree coder which if a wavelet tree corresponding to spatial locations and orientations of the plurality of wavelet coefficients is a zerotree, merges predetermined wavelet zerotrees adjacent to the zerotree, codes merged wavelet zerotrees to one symbol, and outputs the symbol.

BRIEF DESCRIPTION OF THE DRAWINGS

The above object and advantages of the present invention will become more apparent by describing in detail preferred embodiments thereof with reference to the attached drawings in which:

FIGS. 5A through 5C are views showing examples of a zerotree group generated by the optimum zero tree generator of FIG. 3;

DETAILED DESCRIPTION OF PREFERRED EMBODIMENTS

Figure 1:
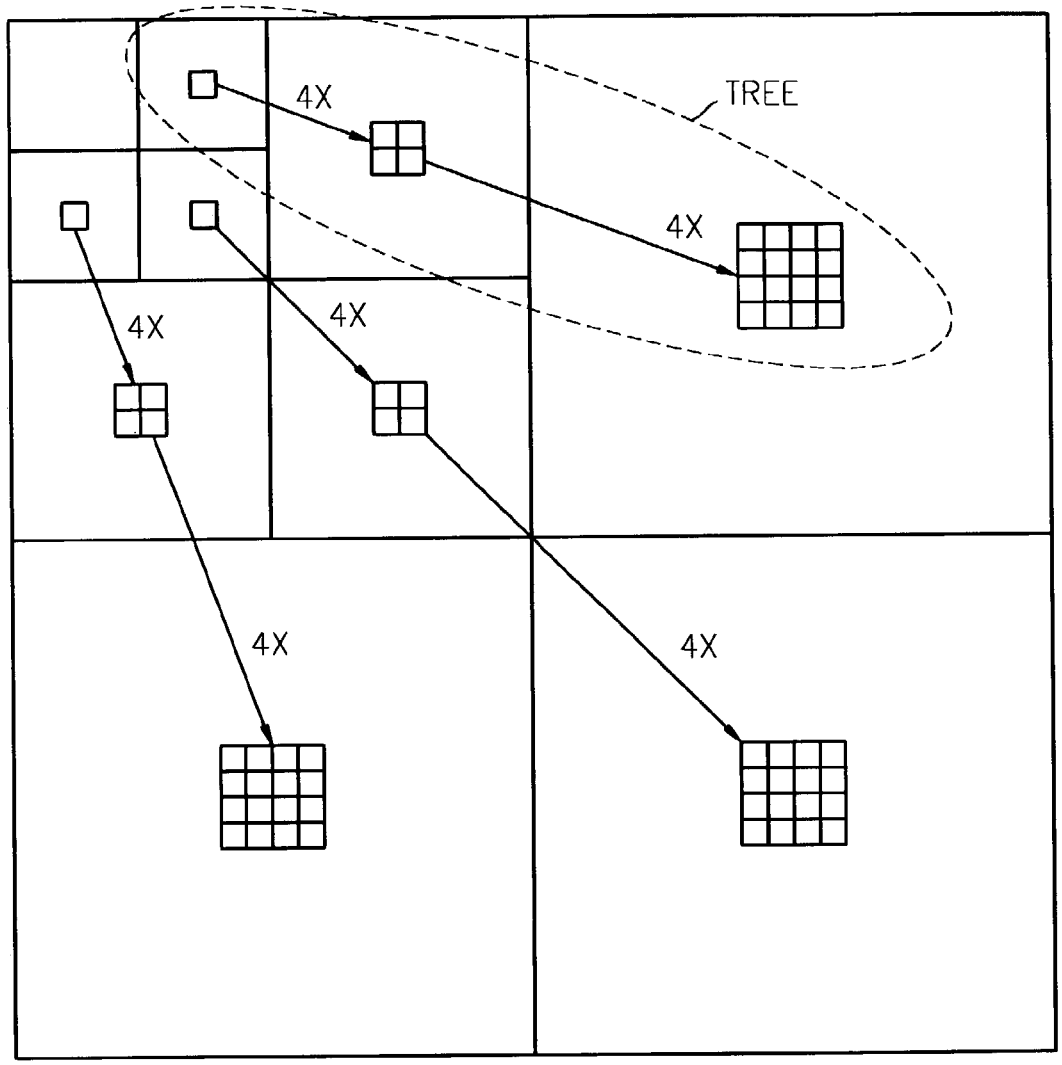
FIG. 1 is a view showing a tree of general wavelet coefficients.

Hereinafter, the present invention will be described in detail by explaining a preferred embodiment of the present invention with reference to the attached drawings. Like reference numerals in the drawings denote the same elements.

Figure 2:
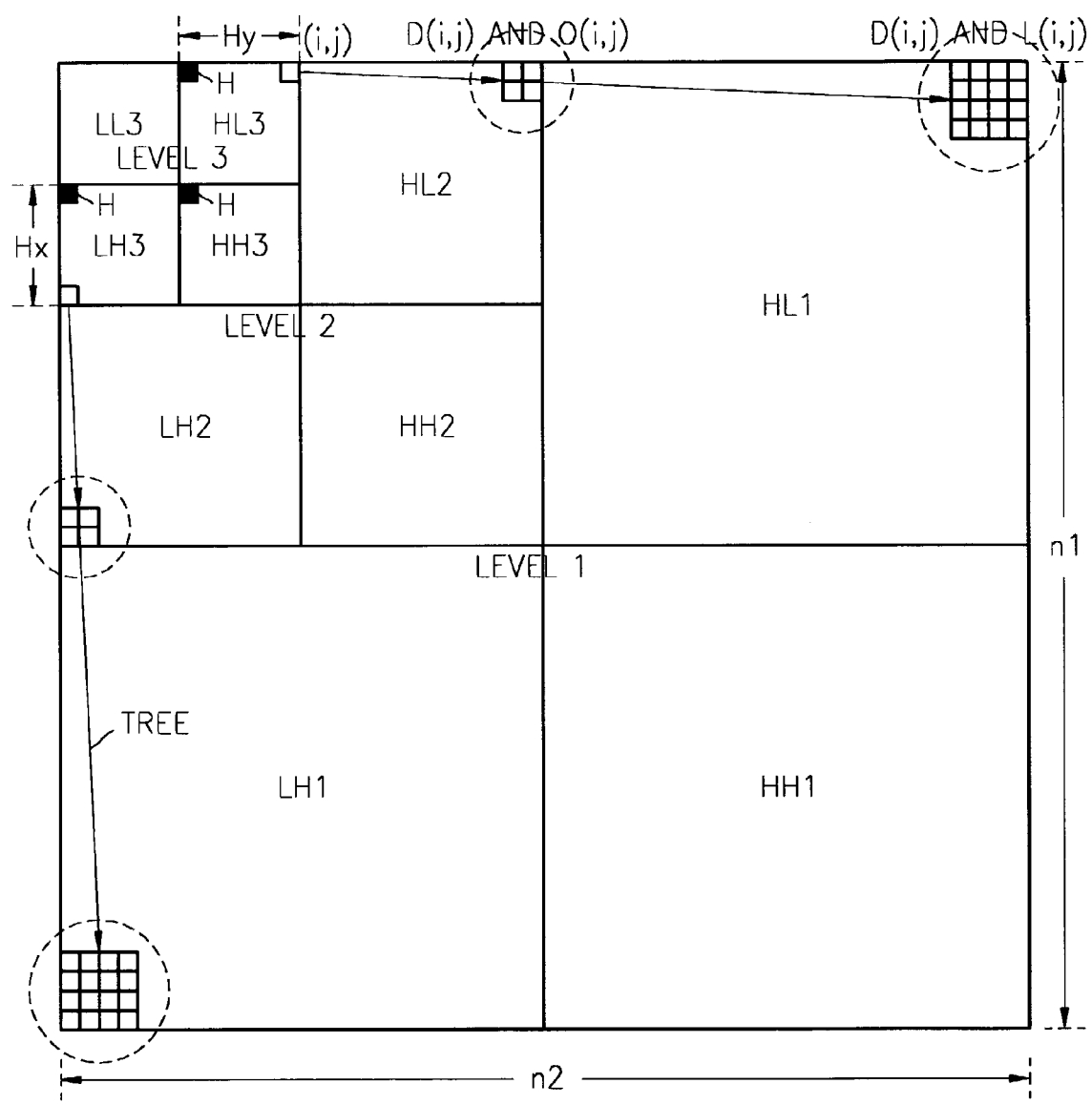
FIG. 2 is a view showing a tree and symbols of wavelet coefficients according to an embodiment of the present invention.

FIG. 2 is a view showing a tree and symbols of wavelet coefficients for explaining a method according to an embodiment of the present invention. For the convenient explanation, symbols used in this specification will be now defined with reference to FIG. 2. n1 and n2 denotes the size of an image, and D(i, j) denotes a set of coefficients of all descendants of nodes or wavelet coefficients (i, j), {all descendants of $c_{ij}$}. O(i, j) denotes a set of coefficients of offspring of a node (i, j), {the four offspring of $c_{ij}$}, and L(i, j) denotes a set of coefficients D(i, j) minus O(i, j), D(i, j)-O(i, j). Here, (i, j) are coordinates of pixels.

A set partitioning rule will now be described. Initial partitioning is achieved for sets {(i, j)} and D(i, j) for {(i, j)∈H}. If the set D(i, j) is significant, the set D(i, j) is partitioned into four sets which are L(i, j) and {(k,1)∈O(i, j)}. If the set L(i, j) is significant, the set L(i, j) is partitioned into four sets D(k, 1) which are {(k, 1)∈O(i, j)}.

H represents a set of coordinates of initial tree roots. In other words, H is a set of coordinates of spatial orientation tree roots.

A list of insignificant sets (LIS) represents a list of sets of coefficients smaller than a threshold value. In other words, the LIS is a list of coordinates of zerotrees.

Here, type A denotes a case where coefficients belonging to the set D(i, j) are smaller than the threshold value. Also, depth_x and depth_y is a number of zerotrees splitting a subband along each direction.

Type B denotes a case where coefficients belonging to the set L(i, j) are smaller than the threshold value.

Accordingly, referring to FIG. 2, depth_x=0 and depth_y=0 indicates that one zerotree root exists in each of HL3, LH3, and HH3. depth_x=1 or depth_y=1 means that two zerotree roots exist in each of HL3, LH3, and HH3. depth_x=1 and depth_y=1 mean that four zerotree roots exist in each of HL3, LH3, and HH3.

A list of insignificant pixels (LIP) is a list of coefficients smaller than the threshold value, i.e., a list of coordinates of all wavelet coefficients.

A list of significant pixels (LSP) is a list of coefficients larger than the threshold value. Levels denote wavelet transform levels.

$$Hx = \frac{n1}{2^{level}} \quad (1)$$

$$Hy = \frac{n2}{2^{level}}$$

$$Sx = \frac{n1}{2^{level+depth\_x}}$$

$$Sx = \frac{n2}{2^{level+depth\_y}}$$

wherein, Hx represents a lengthwise size x of the highest subband, Hy represents a widthwise size y of the highest subband, Sx represents a search range along a lengthwise direction x in a list, and Sy represents a search range along a widthwise direction y in the list.

$$Sn(x, y) = 1, \max_{\substack{i=x, j=y}}^{x+Sxy+Sy} \{|C_{(i,j)}|\} \geq 2^n \quad (2)$$

$$0, \quad \text{otherwise,}$$

wherein, Sn(x, y) is a set of separate pixels.

Hereinafter, a method according to an embodiment of the present invention will be described in detail. A method according to an embodiment of the present invention is based on set partitioning in hierarchical trees (SPIHT).

1. Initialization

Equation 3 is output from an initialisation process.

$$n = \lfloor \log_2(\max_{(i,j)}\{|C_{(i,j)}|\}) \rfloor \quad (3)$$

wherein, $\lfloor \ \rfloor$ represents the maximum integer not larger than $\{|C_{(i,j)}|\}$.

The LSP is set to an empty list, { }, depth_x is set to zero, depth_y is set to zero, and each coordinate {(i, j)∈H} is added to the LIP. For depth_x is zero and depth_y is zero, each coordinate in the set {(i, j)∈H} of type A is added to the LSP.

2. Sorting Pass 2.1. The following methods are performed for each pixel or entry (i, j) in the LIP.

2.1.1. Sn(i, j) is output;

2.1.2. If Sn(i, j)=1, Sx=1, and Sy=1, coordinates (i, j) move to the LSP and signs of $C_{i,j}$ are output.

If Sn(i, j)=1, Sx=1, and Sy≠1, depth_y is increased by 1;

Coordinates (i, j) and $$\left(i, \left(j + \frac{Hy}{2^{depth\_y}}\right)\right)$$

are added to the end of the LIP;
  Coordinates (i, j) are removed from the LIP;
  If Sn(i, j)=1, Sx≠1, and Sy=1,
    depth_x is increased by 1;
    Coordinates (i, j) and $$\left(\left(i + \frac{Hx}{2^{depth\_x}}\right), j\right)$$

are added to the end of the LIP;
  Coordinates (i, j) are removed from the LIP;
  If Sn(i, j)=1, Sx≠1, and Sy≠1,
    depth_x and depth_y are each increased by 1;
    Coordinates (i, j), $$\left(i, \left(j + \frac{Hy}{2^{depth\_y}}\right)\right), \left(\left(i + \frac{Hx}{2^{depth\_x}}\right), j\right), \text{ and }$$
$$\left(\left(i + \frac{Hx}{2^{depth\_x}}\right), \left(j + \frac{Hy}{2^{depth\_y}}\right)\right)$$

are added to the end of the LIP;
  Coordinates (i, j) are removed from the LIP;
2.2. The following methods are performed for each pixel or entry (i, j) in the LIS.
2.2.1. If the entry (i, j) is type A,
  Sn(D(i, j)) is output;
  If Sn(D(i, j))=1, Sx=1, and Sy=1,
    The following methods are performed for each of coordinates (k, 1)∈0(i, j).
      depth_x=log(n1/2)−level;
      depth_y=log(n2/2)−level;
      Sn(k, l) is output;
    If Sn(k, l)=1, coordinates (k, l) are added to the LSP and signs of $C_{k,j}$ are output;
    If Sn(k, l)=0, coordinates (k, l) having depth_x and depth_y are added to the LIP;
    If L(i, j) is not empty, coordinates (i, j) move as an entry of type B to the end of the LIS, and go to 2.2.2;
    If not, the entry (i, j) is removed from the LIS.
  If Sn(D(i, j))=1, Sx=1, and Sy≠1,
    depth_y is increased by 1;
    coordinates (i, j) and $$\left(i, \left(j + \frac{Hy}{2^{depth\_y}}\right)\right)$$

are added as an entry of type A to the end of the LIS;
  Coordinates (i, j) are removed from the LIS;
  If Sn(D(i, j))=1, Sx≠1, and Sy=1,
    Depth_x is increased by 1;
    Coordinates (i, j) and $$\left(i, \left(j + \frac{Hy}{2^{depth\_y}}\right)\right)$$

are added as the entry of type A to the end of the LIS;
  Coordinates (i, j) are removed from the LIS;
  If Sn(D(i, j))=1, Sx≠1, and Sy≠1,
    depth_x and depth_y are each increased by 1;
    Coordinates (i, j) and $$\left(i, \left(j + \frac{Hy}{2^{depth\_y}}\right)\right), \left(\left(i + \frac{Hx}{2^{depth\_x}}\right), j\right), \text{ and }$$
$$\left(\left(i + \frac{Hx}{2^{depth\_x}}\right), \left(j + \frac{Hy}{2^{depth\_y}}\right)\right)$$

are added as the entry of type A to the end of the LIP;
  Coordinates (i, j) are removed from the LIS;
2.2.2. If the entry is type B,
  Sn(L(i, j)) is output;
  If Sn(L,(i, j))=1,
    depth_x=log(n1/2)−level;
    depth_y=log(n2/2)−level;
    Each of coordinates {(k, 1)∈0(i, j) is added as the entry depth_x and depth_y of type A to the end of the LIS;
  Coordinates (i, j) are removed from the LIS;
3. Refinement Pass
  $n^{th}$ bit of $|C_{i,j}|$ is output for each entry (i, j) added to the LSP before a current n.
4. Quantization-step Update
  After n is reduced by 1, the sorting pass is performed.

Figure 3:
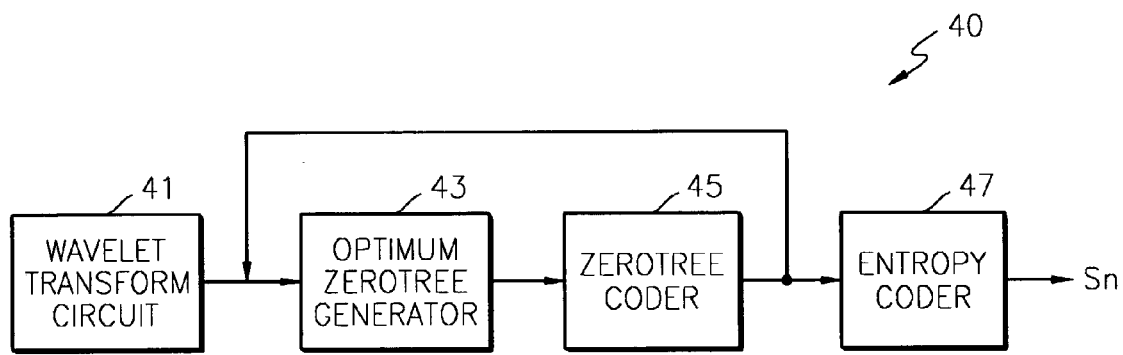
FIG. 3 is a block diagram of an encoder according to an embodiment of the present invention.

FIG. 3 is a block diagram of an encoder according to an embodiment of the present invention. Referring to FIG. 3, an encoder 40 includes a wavelet transform circuit 41, an optimum zerotree generator 43, a zerotree coder 45, and an entropy coder 47.

The wavelet transform circuit 41 wavelet-transforms an input image to a wavelet domain having a plurality of wavelet coefficients or nodes. FIG. 2 shows a wavelet domain. In other words, the wavelet transform circuit 41 wavelet-transforms the input image to a predetermined level or scale.

The optimum zerotree generator 43 generates a plurality of zerotrees corresponding to the same spatial locations and orientations of the plurality of wavelet coefficients in response to signals output from the zerotree coder 45 and the wavelet transform circuit 41. In other words, the optimum zerotree generator 43 organizes an optimum zerotree using spatial correlations among the wavelet coefficients.

The zerotree coder 45 merges a plurality of adjacent zero trees, and codes the merged zerotrees to one symbol, and outputs the symbol to the entropy coder 47 and the optimum zerotree generator 43.

If a wavelet tree corresponding to the same spatial locations and orientations of a plurality of wavelet coefficients output from the wavelet transform circuit 41 is a zerotree, the optimum zerotree generator 43 or the zerotree coder 45 may merge predetermined wavelet zerotrees adjacent to the zero tree, and code a plurality of merged wavelet zerotrees to one symbol, and output the symbol. Thus, the optimum zerotree generator 43 and the zerotree coder 45 may be constructed as a single circuit.

Also, the optimum zerotree generator 43 or the zerotree coder 45 may separately code wavelet coefficients that do not constitute zerotrees. The entropy coder 47 receives a signal output from the zerotree coder 45 and creates a bitstream. Thus, the encoder according to an embodiment of the present invention codes an input image to a bitstream using a zerotree wavelet transform.

Figure 4:
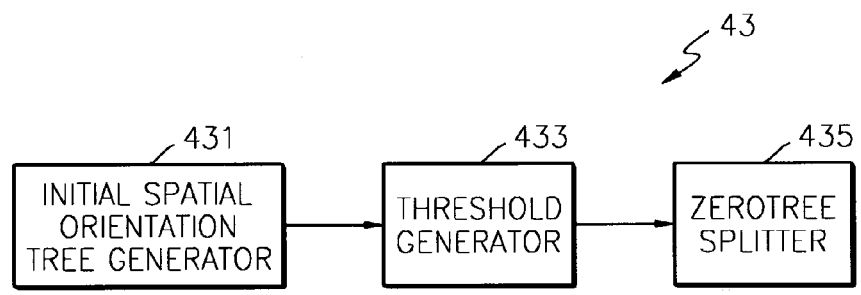
FIG. 4 is a detailed block diagram of an optimum zerotree generator of FIG. 3.
Figure 5A:
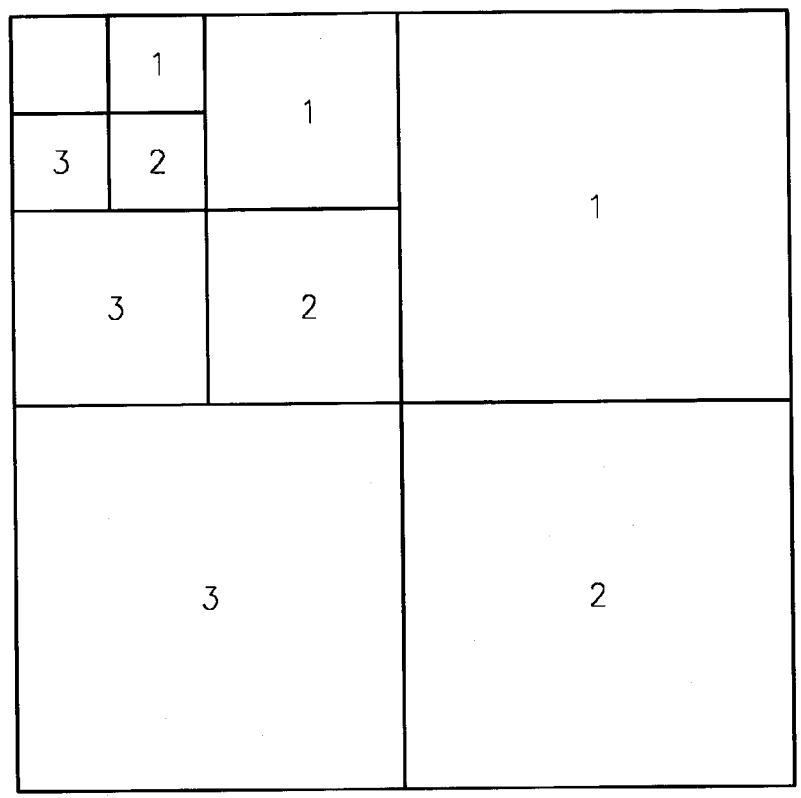
Figure 5B:
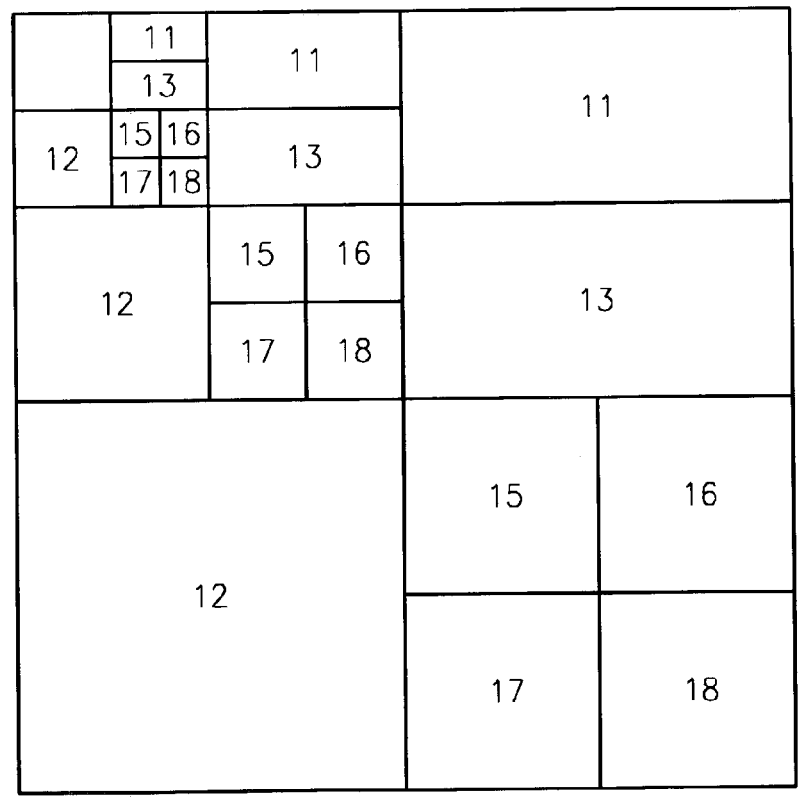
Figure 5C:
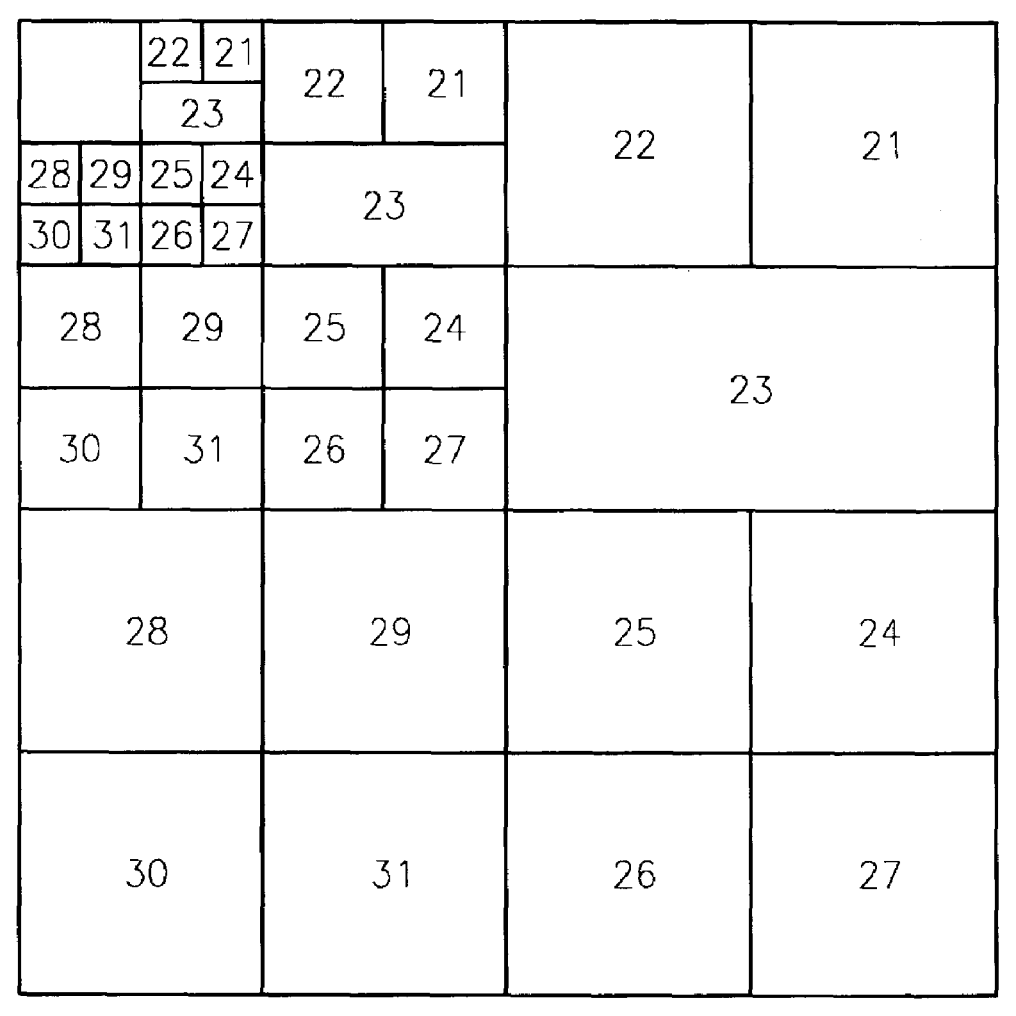

FIG. 4 is a detailed block diagram of the optimum zerotree generator 43 shown in FIG. 3. FIGS. 5A through 5C show examples of a zerotree group generated by the optimum zerotree generator 43 shown in FIG. 3.

Referring to FIGS. 4 and 5A through 5C, the optimum zerotree generator 43 includes an initial spatial orientation tree generator 431, a threshold generator 433, and a zerotree splitter 435.

The initial spatial orientation tree generator 431 constitutes initial zerotree groups. In other words, initialized subbands constitute zerotrees. FIG. 5A, in the initial stage, three zerotree groups exist. Here, the same numbers denote zerotrees corresponding to the same spatial locations and orientations of wavelet coefficients.

The threshold generator 433 is connected to the initial spatial orientation tree generator 431 and sets a threshold value for quantization. The threshold generator 433 initially outputs n represented by equation 3, reduces the n by 1 while executing a method according to an embodiment of the present invention, and outputs the reduced result value. When the threshold value is determined from the threshold generator 433, zerotree groups, with respect to the determined threshold value, are split as shown in FIG. 5B.

The zerotree splitter 435 receives a quantization threshold value output from the threshold generator 433, compares wavelet coefficients with the quantization threshold value, and if there are wavelet coefficients larger than the quantization threshold value, split zerotree groups using the wavelet coefficients.

Referring to FIG. 5C, the same numbers belong to the same zerotree groups. As n decreases, the zerotree splitter 435 splits the zerotree groups to increase depth_x and depth_y.

Figure 6:
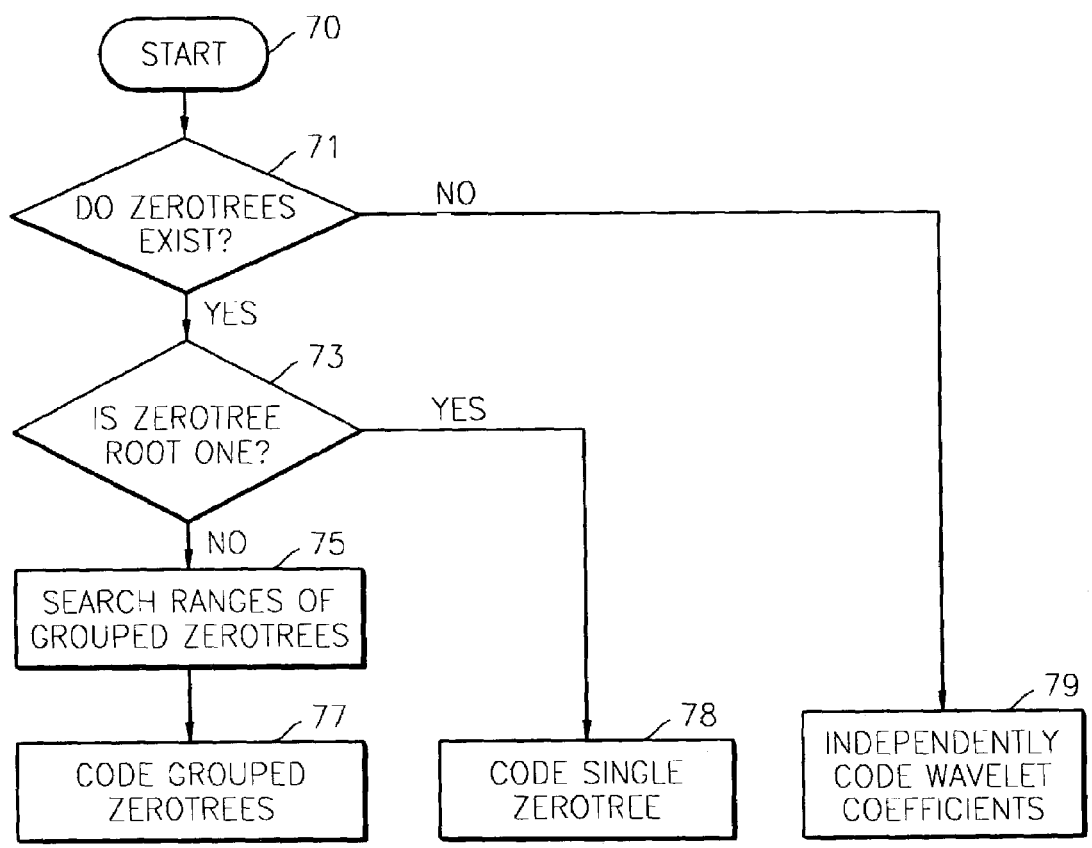
FIG. 6 is a flowchart of a method of coding an input image to a bit stream using a zerotree wavelet transform according to an embodiment of the present invention.

FIG. 6 is a flowchart illustrating a method of coding an input image to a bitstream using a zerotree wavelet transform for generating a plurality of wavelet trees each having a plurality of wavelet coefficients.

According to FIGS. 3 through 6, in block 71, the optimum zerotree generator 43 determines whether current wavelet coefficients constitute at least one or more zerotrees. In other words, in block 71, it is determined whether each wavelet tree is a zerotree.

If the current wavelet coefficients do not constitute at least one or more zerotrees, in block 79, the zerotree coder 45 separately codes the current wavelet coefficients. In other words, if each wavelet tree is not a zerotree, the zerotree coder 45 separately codes and outputs each wavelet coefficient belonging to each wavelet tree.

If the current wavelet coefficients constitute at least one zerotree, in block 73, the optimum zerotree generator 43 determines the number of zerotree roots. If there is one zerotree root, in block 78, the zerotree coder 45 codes one zerotree root.

However, if there are two or more zerotree roots, in block 75, the optimum zerotree generator 43 searches the ranges of adjacent zerotree roots. The zerotree coder 45 merges a plurality of adjacent zerotrees, i.e., zerotree groups, codes the merged zerotrees to one symbol, and outputs the symbol to the entropy coder 47.

Figure 7:
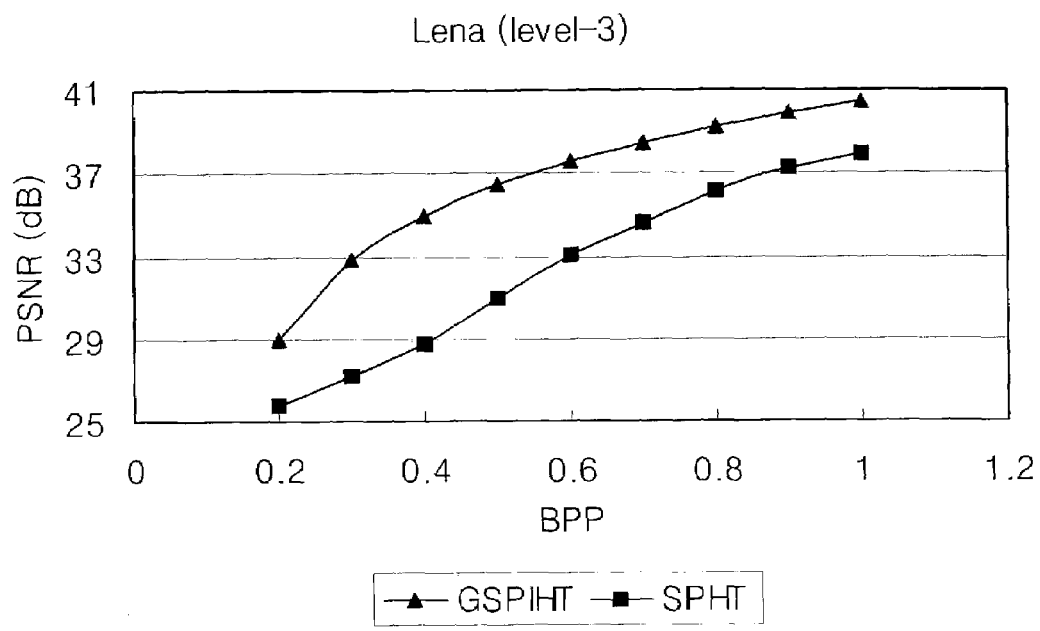
FIG. 7 is a graph showing bit per pixel (BPP) and peak signal to noise ratio (PSNR) for comparing a prior art method and a method according to an embodiment of the present invention when transforming a lena image to three levels.
Figure 8:
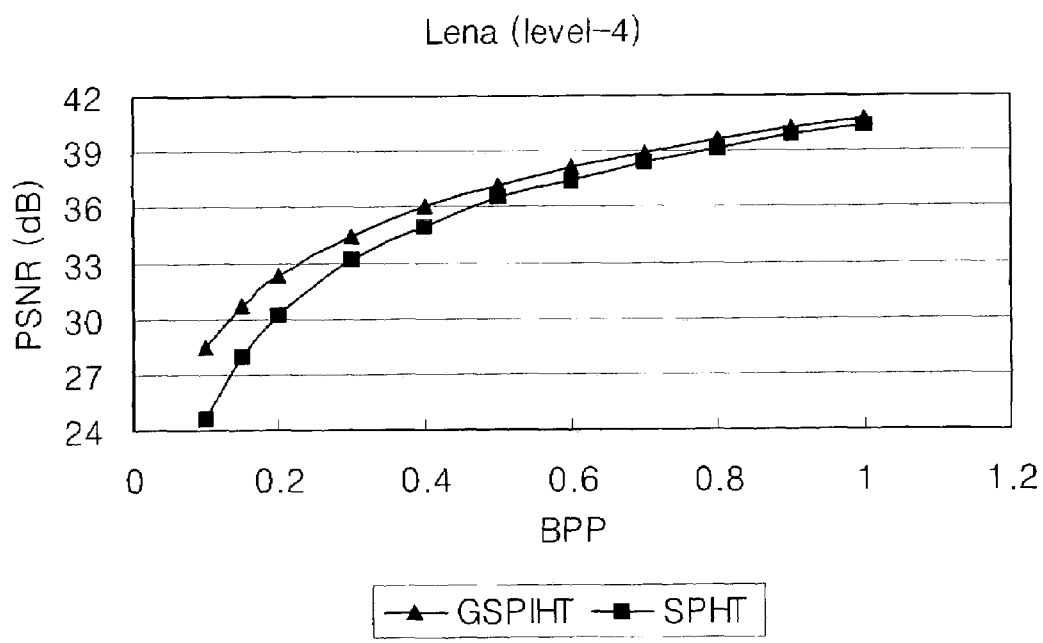
FIG. 8 is a graph showing BPP and PSNR for comparing a prior art method and a method according to an embodiment of the present invention when transforming a lena image to four levels.

FIG. 7 shows bit per pixel (BPP) and peak signal to noise ratio (PSNR) according to the prior art SPIHT algorithm and a grouped set partitioning in hierarchical trees (GSPIHT) method according to an embodiment of the present invention when a lena image is transformed to three levels. FIG. 8 shows BPP and PSNR according to the prior art SPIHT algorithm and a GSPIHT method according to an embodiment of the present invention when a lena image is transformed to four levels.

Equations 4 and 5 represent evaluation measures PSNR shown in FIGS. 7 through 10.

$$RMSE = \sqrt{\frac{1}{NM} \sum_{i=0}^{N-1} \sum_{j=0}^{M-1} [Y(i, j) - X(i - j)]^2} \quad (4)$$

wherein, $X(i, j)$ and $Y(i, j)$ represent an original image and a reconstructed image, respectively. Here, an objective efficiency evaluation measure is a root mean square error (RMSE).

$$PSNR = 20 \log_{10}\left(\frac{255}{RMSE}\right) \quad (5)$$

Referring to FIGS. 7 and 8, an encoder implementing a method according to an embodiment of the present invention shows more efficient coding than an encoder using the prior art algorithm regardless of a wavelet transform level.

Figure 9:
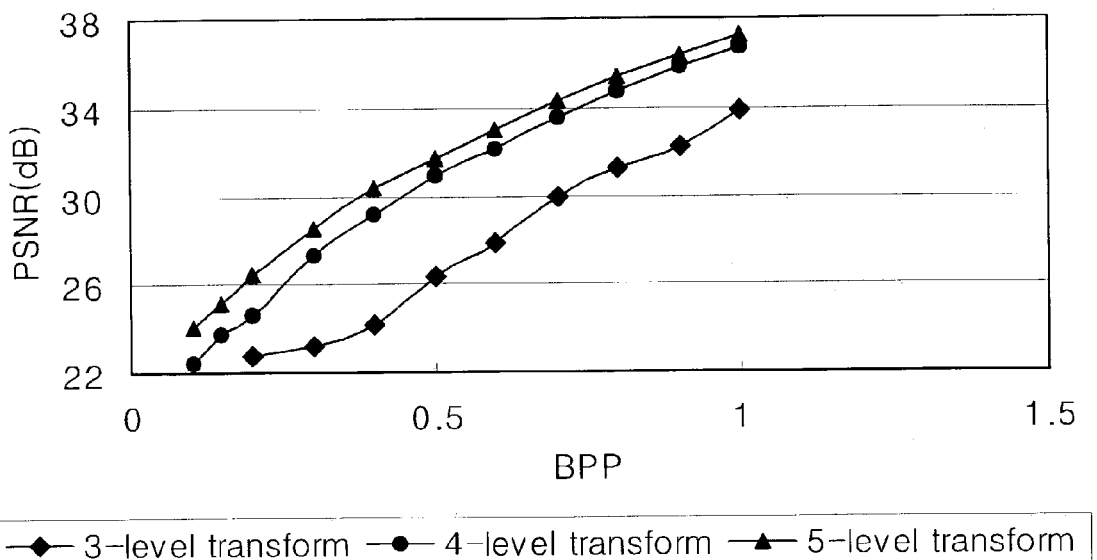
FIG. 9 is a graph showing coding efficiency when coding a barbara image using the prior art method.
Figure 10:
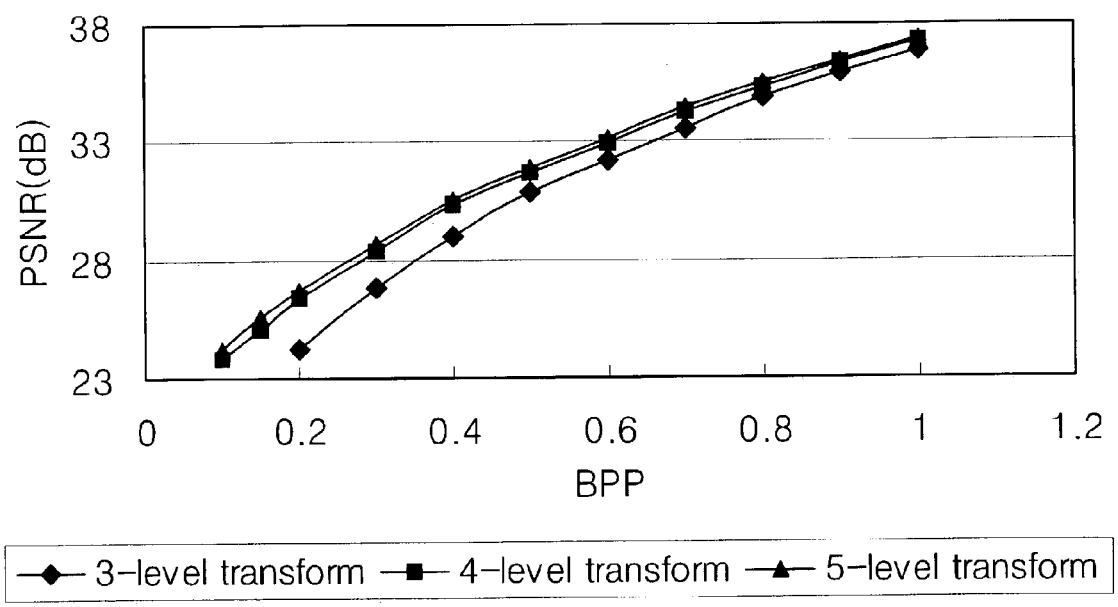
FIG. 10 is a graph showing coding efficiency when coding a barbara image using a method according to an embodiment of the present invention.

FIG. 9 shows an efficiency of coding a barbara image using the prior art SPIHT algorithm. FIG. 10 shows an efficiency of coding a barbara image using a GSPIHT method according to an embodiment of the present invention. Referring to FIGS. 9 and 10, it can be seen that coding efficiency of an encoder using a GSPIHT method is more improved and stabilized than coding efficiency of an encoder using the prior art SPIHT algorithm.

According to an embodiment of the present invention, an encoder using a zerotree wavelet image coding algorithm and the SPIHT algorithm merges a plurality of adjacent zerotrees, and codes the merged zerotrees to one symbol and outputs the symbol.

As described above, in method of and an system for coding grouped zerotree wavelet image according to the present invention, coding efficiency can be improved.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method of coding an input image to a bitstream by using a zerotree wavelet transform, the method comprising:
   merging a plurality of adjacent zerotrees; having different roots; and
   coding the merged zerotrees to one symbol and outputting the symbol.

2. The method of claim 1, further comprising:
   transforming the input image to a wavelet domain having a plurality of wavelet coefficients via the zerotree wavelet transform; and
   generating the plurality of adjacent zerotrees each having the plurality of wavelet coefficients.

3. A method of coding an input image to a bitstream by using a wavelet transform for generating a plurality of wavelet trees each having a plurality of wavelet coefficients, the method comprising:
(a) determining whether each of the wavelet trees is a zero tree;
(b) determining adjacent zerotrees having different roots;
(c) merging the adjacent zerotrees; and
(d) coding merged zerotrees to one symbol and outputting the symbol.

4. The method of claim 3, wherein if it is determined in step (a) that each of the wavelet trees is not a zero tree, wavelet coefficients belonging to the each of the wavelet trees are separately coded and output.

5. The method of claim 3, wherein if it is determined in step (a) that one zero tree exists, the zerotree is coded and output.

6. A computer-readable recording medium in which a program for executing a method of coding an input image to a bitstream by using a zerotree wavelet transform is recorded, the method comprising:
merging a plurality of adjacent zerotrees having different roots; and
coding the merged zerotrees to one symbol and outputting the symbol.

7. A computer-readable recording medium in which a program for executing a method of coding an input image to a bitstream by using a wavelet transform for generating a plurality of wavelet trees each having a plurality of wavelet coefficients is recorded, the method comprising:
(a) determining whether each of the wavelet trees is a zerotree;
(b) determining adjacent zerotrees having different roots;
(c) merging the adjacent zerotrees; and
(d) coding merged zerotrees to one symbol and outputting the symbol.

8. The computer-readable recording medium of claim 7, wherein in the method, if it is determined in step (a) that each of the wavelet trees is not a zerotree, wavelet coefficients belonging to each of the wavelet tree are separately coded and output.

9. The computer-readable recording medium of claim 7, wherein in the method, if it is determined in step (a) that one zerotree exists, the zerotree is coded and output.

10. An encoder of coding a zerotree wavelet image, the encoder comprising:
a discrete wavelet transform circuit which wavelet-transforms an input image to a wavelet domain having a plurality of wavelet coefficients;
a zerotree generator which generates a plurality of zerotrees corresponding to spatial locations and orientations of the plurality of wavelet coefficients; and
a zerotree coder which merges a plurality of adjacent zerotrees having different roots, codes merged zerotrees to one symbol, and outputting the symbol.

11. An encoder of coding a zerotree wavelet image, the encoder comprising:
a discrete wavelet transform circuit which wavelet-transforms an input image to a wavelet domain having a plurality of wavelet coefficients; and
a zerotree coder which if a wavelet tree corresponding to spatial locations and orientations of the plurality of wavelet coefficients is a zerotree, merges predetermined wavelet zerotrees adjacent to the zerotree and having different roots therefrom, codes merged wavelet zerotrees to one symbol, and outputs the symbol.

* * * * *